Jan. 31, 1956  P. E. BERNIER  2,732,676
COMBINE PICKUP AND CONVEYOR WITH CONTROL MEANS THEREFOR
Filed Dec. 3, 1952  2 Sheets-Sheet 1
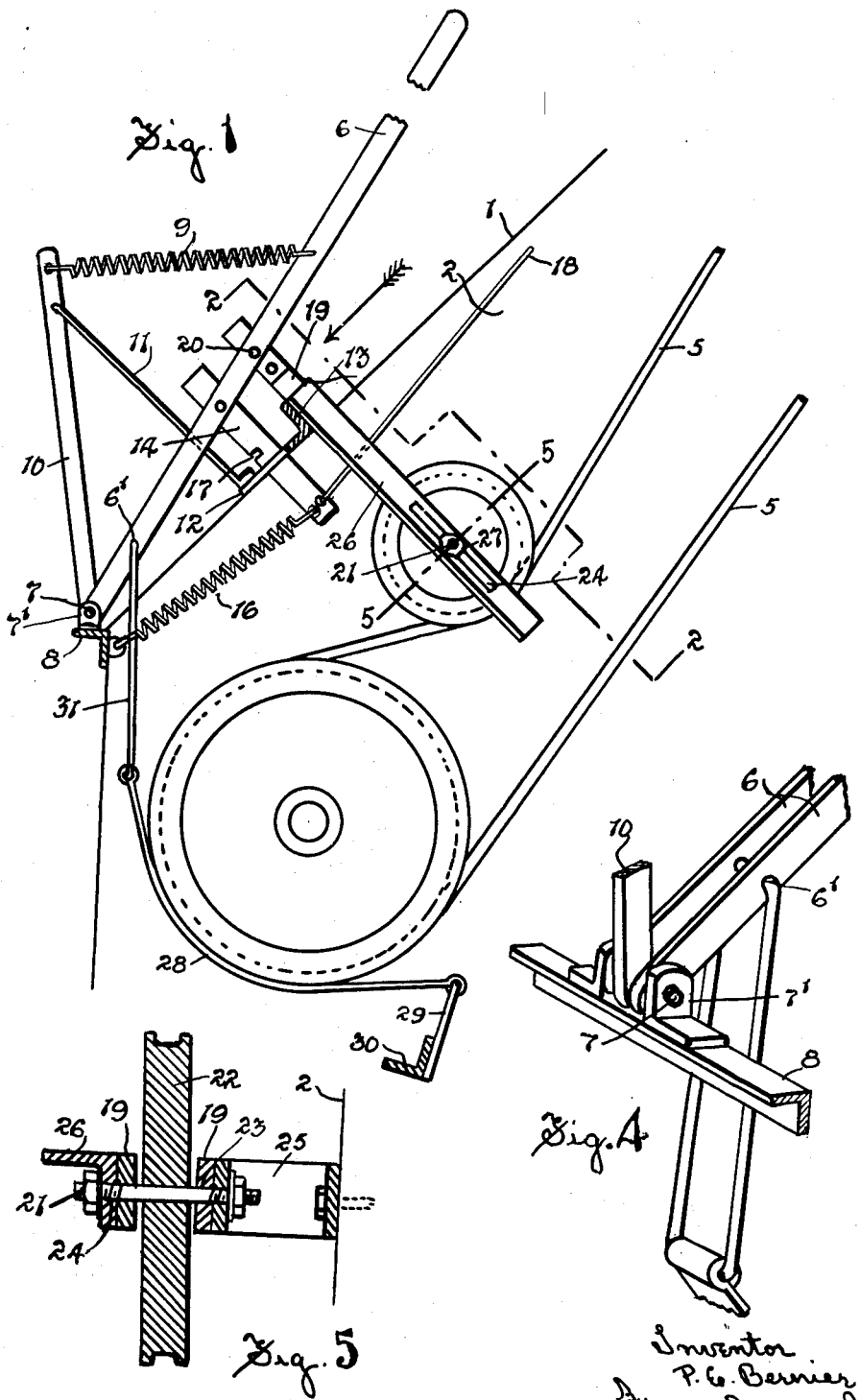

Jan. 31, 1956   P. E. BERNIER   2,732,676
COMBINE PICKUP AND CONVEYOR WITH CONTROL MEANS THEREFOR
Filed Dec. 3, 1952   2 Sheets-Sheet 2
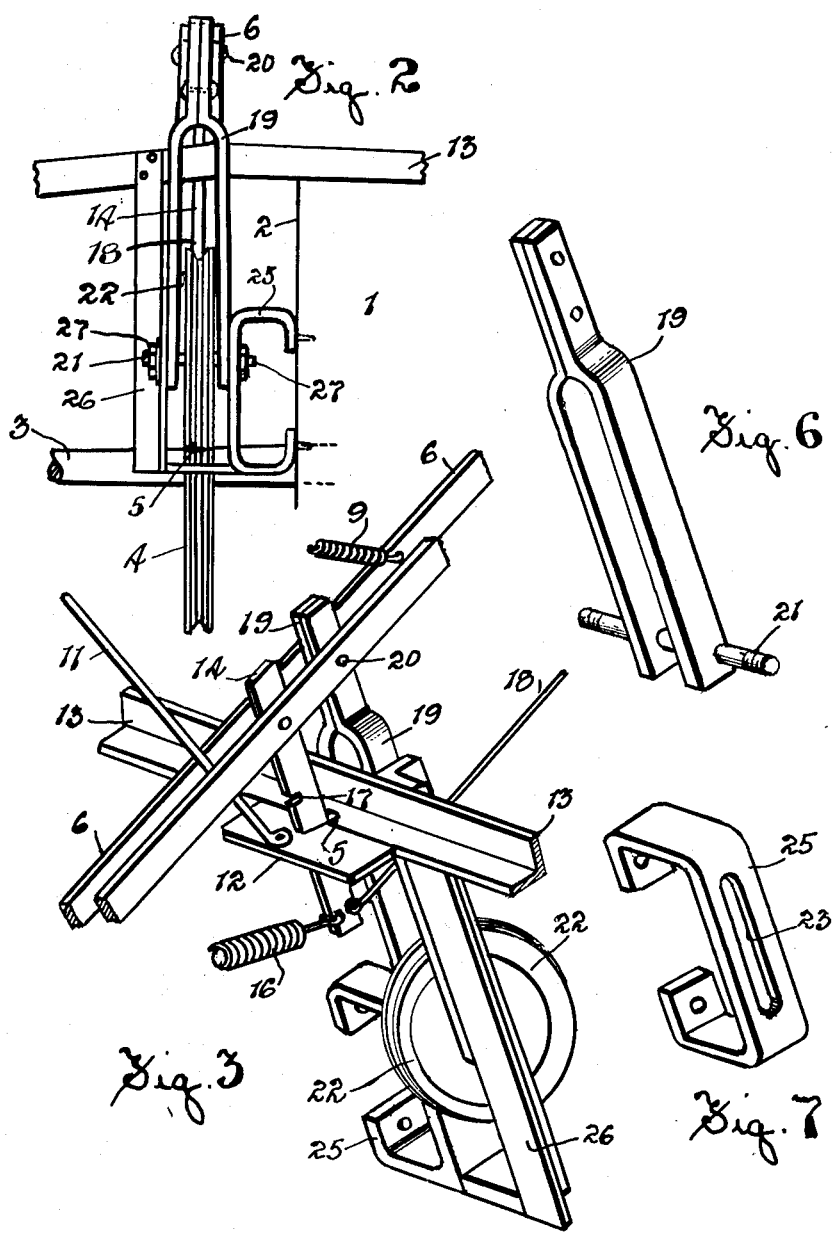
Inventor
P. Bernier
By G. S. Roxburgh
His atty

United States Patent Office 2,732,676
Patented Jan. 31, 1956

2,732,676

COMBINE PICKUP AND CONVEYOR WITH CONTROL MEANS THEREFOR

Paul E. Bernier, Fisher Branch, Manitoba, Canada

Application December 3, 1952, Serial No. 323,820

4 Claims. (Cl. 56—10)

Combines, in general, are provided with a transverse, horizontal, forward platform which has means, such as worms or a worm, for delivering grain received by the platform to a point where such can be picked up by a driven endless conveyor and discharged by the conveyor to the usual cylinder and concave with which combines are supplied. Combines are also supplied with what is called a pick-up attachment whose function is, when attached to the machine, to gather grain lying in a swath on the field and deliver it onto the platform to be directed by a worm or worms to a point to be elevated by the endless conveyor above mentioned.

I have found that with existing machines that one is very apt to have the machine or combine damaged by stones, roots and other hard foreign material lying on the field and picked up with the grain and delivered to the conveyor and reach the cylinder and concave before the attendant can stop the moving, grain delivering parts, including the pick-up attachment, the worm or worms and the conveyor. Actually one might see picked up roots, stones and the like, and immediately shut off the power driving the pick-up attachment, the worm or worms and the conveyor, but it is found that even if such be done, the momentum of the latter moving parts causes them to continue to rotate and the damaging material is delivered to the cylinder and concave before such parts become dead and in this connection it is explained that the cylinder is separately driven and is not affected by the shutting off of the power above mentioned.

It is with the object of avoiding damage to the machine by stones, roots and other hard foreign material that the present invention has been devised and which parts are so arranged that when the operator sees such damaging material picked up with the grain, he can immediately and positively stop the driven parts which deliver the grain to the cylinder and concave and thereby prevent any damage being done.

Referring now to the drawings:

Fig. 1 is a side view of my attachment as installed at one side of an existing combine casing containing the endless conveyor.

Fig. 2 is a cross sectional view at 2—2, Fig. 1, and looking in the direction of the applied arrow.

Fig. 3 is a perspective view of a number of parts which I supply.

Fig. 4 is a perspective view showing the forward end of the hand operated lever and the link associated therewith.

Fig. 5 is an enlarged detailed cross sectional view at 5—5, Fig. 1.

Fig. 6 is a perspective view of the forked hanger and the spindle carried thereby.

Fig. 7 is a perspective view of the bracket which is secured to the side of the conveyor casing.

In the drawings like characters of reference indicate corresponding parts in the several figures.

I have not considered it necessary to show those well known parts of the combine which function to gather the grain lying in a swath on a field and deliver it to the well known endless conveyor for discharge to the cylinder and concave, it being only necessary for the purposes of my invention to understand that in the construction appearing in Figs. 1 to 7 inclusive of the drawings, the lower driven conveyor shaft is utilized to drive those parts functioning for the above purpose.

The forward, lower end of an existing combine, enclosed conveyor is indicated in general by the reference numeral 1, 2 being one of the side walls of the conveyor enclosing casing and 3 being the shaft which drives the lower end of the conventional conveyor and which shaft is supplied with a pulley 4 driven by an applied endless belt 5 from an elevated power shaft not shown. The shaft 3 is extended well to the side of the conveyor casing and its extended end is utilized to drive those forward parts of the combine which pick up the swathed grain lying on the field and deliver it to the lower end of the driven conveyor.

In equipping the combine with my invention, I supply an inclined hand actuated lever 6 which has its forward end forked and secured pivotally by a pin 7 to lugs 7' fastened to a transverse, existing, angle bar 8, the latter transversely crossing the upper part of the conveyor casing and being secured thereto. The upper end of the lever terminates within convenient range of the driver or attendant who is seated in a prominent elevated position on the front part of the machine so that his vision is unobstructed. The lever is held normally in an up position by a coiled spring 9 which has its ends connected to the lever and to an upstanding bar or post 10, the latter having its lower end mounted on the pin 7 and the body part thereof held in a fixed position by a brace rod 11. This rod passes angularly downward and has its lower end secured to a short length of plate 12 which is securely welded to the flange of an existing angle bar 13 which crosses the upper part of the conveyor casing and extends therebeyond.

The lever carries pivotally a locking latch 14 which passes downwardly, slidably through a slot 15 provided in the plate 12 and angle bar 13 and the lower end of the latch has a tension spring 16 secured thereto to cause a notch 17 in the latch to engage the plate and releasably lock the lever in a down position. I might here explain that the plate has been added to the flange of the angle bar 13 for the reason that the flange of the corresponding bar in the existing combine is not sufficiently wide to allow of the formation of the required slot. A pulling line 18 is also secured to the lower end of the latch and passes angularly upwardly to within convenient range of the driver's seat where it is anchored, the arrangement being that upon the driver pulling the line the notch is cleared from the slot and the lever is freed to move to its forward position under the pull of the spring 9.

The lever has a forked hanger 19 pivotally secured thereto by a pin 20 and the hanger extends angularly downwardly behind the bar 13 and has its lower end provided with a spindle 21 on which a pulley 22 is mounted, the pulley being between the forks and in the same vertical plane as the pulley 4. The ends of the spindle are extended beyond the forks and are received in guide slots 23 and 24, the slot 23 being formed in a bracket 25 permanently secured to the side 2 of the conveyor casing and the slot 24 being formed in a down going angle bar 26 which has its upper end welded to the bar 13. The screw threaded ends of the spindle are supplied with jam nuts 27 so that one can set the pulley to properly tension the belt 5 when the lever is in its forward, latch locked position as shown in Fig. 1. It will be obvious, that when the line 18 is pulled, the lever will be released to move forwardly under the influence of the spring 9 and in so doing will move the pulley 22 to slacken the belt 5.

Co-incident with the slackening of the belt, I desire that a brake band be applied on the pulley 4 to stop its rotation and by so doing effect the immediate cessation of delivery movement of the conveyor and all the fore-parts of the combine provided to gather the grain lying in a swath on the field and delivering such to the lower end of the conveyor and which latter are driven by the shaft 3. To this end I provide a brake band 28 underlying the pulley 4 and which has one end anchored to a short bar 29 extending upwardly from a fixed angle bar 30 which latter extends outwardly from the underside of the conveyor casing in the existing machine. The other or forward end of the brake band is secured by a link 31 pivotally to the lever at 6'.

It will be obvious from the latter arrangement that when the latch is released by the pulling of the line to slack the pulley 22 from the belt 5 and the lever moves forwardly, the link will be end shifted upwardly to tighten the brake band on the pulley 4 and instantaneously stop its rotation and that of the shaft 3.

From the above it will be clear that when the driver of the combine observes a stone, root or other hard foreign material picked up with the grain from the field, all he has to do is to pull the line 18 and instantly the belt 5 is slacked and the brake band is applied on the pulley 4 and all such happens before the stone or root can cause any damage to the cylinder or concave of the combine. After the stone or root has been removed by the attendant or driver, the depression of the upper end of the lever resets the latch, tightens the belt and releases the brake band and operations are resumed.

In the device as herein shown and described, it will be noted that the lower conveyor shaft of the combine is driven and is utilized to drive the hereinbefore mentioned working parts of the pick-up attachment and that it is the momentum of such latter parts and the conveyor which causes them to continue to operate after the power driving the conveyor has been shut off. In some types of combines, the lower conveyor shaft, as herein shown, is used to drive the working parts of the pick-up attachment but in other types of combines, the upper conveyor shaft is driven and utilized to drive the working parts of the pick-up attachment. Accordingly, I wish it to be distinctly understood that regardless of which conveyor shaft is used to drive the conveyor and the pick-up attachment, the principal feature of the invention resides in providing means to positively and immediately overcome the momentum of the moving parts feeding to the cylinder and concave and driven by the conveyor shaft upon the power driving such shaft being shut off.

What I claim as my invention is:

1. In a combine, the combination with the drive shaft driving the combine pick-up attachment and the grain receiving, elevating conveyor associated therewith and a belt driven pulley secured to said shaft, of a pivotally mounted lever conveniently operable by the combine attendant, a pulley movable with the lever towards and away from the belt, means releasably locking the lever in a position with the latter pulley engaged with the belt to take up slack therein, remotely controlled means for releasing said locking means, spring means acting through the lever to move the latter pulley away from the belt upon said locking means being released and means operating coincidently with the release of the locking means to apply a brake band on the first mentioned pulley.

2. In a combine, the combination with the drive shaft driving the combine pick-up attachment and the grain receiving, elevating conveyor associated therewith and a belt driven pulley secured to the said shaft, of an extending pivotally mounted lever terminating within convenient range of the combine operator, an idler pulley movable with the lever towards and away from the belt, means automatically and releasably locking the lever in a position with the idler pulley engaging the belt to take up slack therein, remotely controlled means operable by the combine operator for releasing said locking means, spring means acting through the lever to move the idler pulley away from the belt upon said locking means being released, a brake band associated with the first mentioned pulley and normally clear of the same and a connection between the band and the lever operating to apply the band on the latter pulley co-incident with the release of the locking means.

3. In a combine, the combination with the drive shaft driving the combine pick-up attachment and the grain receiving, elevating conveyor associated therewith and a belt driven pulley secured to the said shaft, of an extending, pivotally mounted, hand actuated lever terminating within convenient range of the combine operator, a hanger pivotally secured to the lever and extending towards the belt, an idler pulley carried by the hanger and engageable with the belt in a down position of the lever to take up slack in the belt, a spring pressed latch carried by the lever and releasably locking the lever in a down position, remotely controlled means operable by the combine operator for releasing the locking latch, a spring for raising the lever upon release of the latch and a brake band associated with the drive pulley and having one end fixed and the other end connected to the lever in a manner to frictionally apply the band on latter pulley upon the latch being released and the lever rising under the influence of its spring.

4. The device as claimed in claim 3 wherein the idler pulley is adjustably carried by the hanger for adjustment towards and away from the belt.

References Cited in the file of this patent

UNITED STATES PATENTS

| | | |
|---|---|---|
| 1,769,031 | Lindgren | July 1, 1930 |
| 1,820,570 | Krause | Aug. 25, 1931 |
| 2,306,755 | Ronning | Dec. 29, 1942 |